June 2, 1970  K. M. WELCH  3,515,309
SENSITIVE BURST DIAPHRAGM FOR RELIEF OF OVERPRESSURES
Filed Oct. 18, 1968
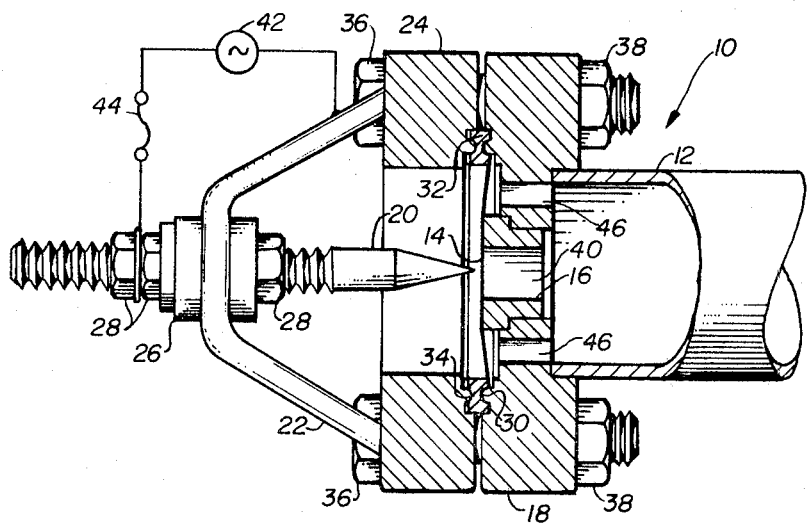
INVENTOR.
KIMO M. WELCH
BY
ATTORNEY United States Patent Office 3,515,309
Patented June 2, 1970

3,515,309
SENSITIVE BURST DIAPHRAGM FOR RELIEF
OF OVERPRESSURES
Kimo M. Welch, Palo Alto, Calif., assignor to the United
States of America as represented by the United States
Atomic Energy Commission
Filed Oct. 18, 1968, Ser. No. 768,629
Int. Cl. F16k 13/04; B65d 25/00
U.S. Cl. 220—89                                  9 Claims

ABSTRACT OF THE DISCLOSURE

Overpressure relief apparatus having a fused electric power source connected across a burst diaphragm and a puncture needle. The needle is spaced a predetermined distance from the diaphragm under normal pressure. Under a differential overpressure the diaphragm is moved into electrical contact with the needle, causing an electric current limited by the capacity of the fuse to positively rupture the diaphragm. The apparatus is made responsive to predetermined overpressures by needle spacing, diaphragm thickness, and wrinkle-free stretching of the diaphragm over a support bushing with a gasket forced against the periphery of the diaphragm and opposing flange ridges, thereby also forming a vacuum seal.

The invention disclosed herein was made under, or in, the course of Contract No. AT(04–3)–400 with the United States Atomic Energy Commission.

Background of the invention

The present invention relates to pressure relief apparatus, and more particularly, it relates to a burst diaphragm puncturable with an electric current.

It is common in pressurized systems of various kinds to provide protection from overpressures for prevention of damage to personnel and equipment, including instrumentation which is particularly susceptible of damage due to overpressure. In many pressurized and vacuum systems, as for example in a gas mixing system or a closed cryogenic pumping system, it is desirable that overpressure protection be effective at precisely predetermined differential pressures to prevent damage to sensitive instruments which can be damaged by only slight overpressures. Protection at precisely predetermined differential pressures is also important in pressurized systems that are susceptible to a rapid buildup of pressure to destructive levels that can result in damage to both personnel and equipment. Rapid pressure buidups should be immediately relieved with fast operating protection devices. Preferably, precise and rapid protection is achieved without resort to complex and expensive arrangements.

Summary of the invention

In brief, the present invention pertains to relieving differential overpressures with an electrically conductive diaphragm that is moved, in response to a differential overpressure, into electrical contact with an electrode spaced a predetermined distance from the diaphragm when the diaphragm is under a normal pressure. An electric power source is connected across the electrode and diaphragm so that upon contact of the diaphragm with the electrode an electric current is supplied that rapidly and effectively ruptures the diaphragm to relieve the overpressure. The current is supplied through a current limiting device that restricts the current to a safe level for a limited time, yet it allows a choice of current level sufficient to positively rupture the diaphragm to a desired extent. The diaphragm may be made to rupture at a precisely predetermined differential overpressure by choice of diaphragm thickness, needle spacing and by wrinkle-free stretching of the diaphragm to have a consistent comparable tension. Such stretching is accomplished by mounting the diaphragm to have the periphery of one side over a ridge of semicircular cross section projecting from the face of a first flange. A second flange is used to force a gasket against the opposite side of the diaphragm for stretching the diaphragm, free of wrinkles, to a consistent comparable tension. The gasket, flanges and diaphragm also form a high-vacuum seal.

It is an object of the invention to effectively and rapidly relieve an overpressure at a precisely predetermined pressure level with apparatus that is simple and inexpensive.

Another object is to rupture a burst diaphragm with an electric current.

Another object is to stretch a diaphragm to a consistent comparable tension while maintaining the diaphragm surfaces free of wrinkles and vacuum sealed at its periphery.

Other objects and advantageous features of the invention will be apparent in a description of a specific embodiment thereof, given by way of example only, to enable one skilled in the art to readily practice the invention, and described hereinafter with reference to the accompanying drawing.

Brief description of the drawing

The figure is a diagram, partially in cross section, of a differential overpressure relief device, according to the invention.

Description of an embodiment

Referring to the figure there is shown an overpressure relief device 10 connected to a vacuum system through a vacuum manifold 12. The device 10 is comprised of a thin electrically conductive burst diaphragm 14 that is stretched over a support bushing 16. The bushing is centrally mounted flush in the face of a flange 18 that is secured to the manifold 12. An electrode in the form of an electrically conductive puncture needle 20 is centrally mounted opposite the diaphragm 14 by means of a mounting frame 22 secured to a flange 24. The needle 20 is electrically insulated from the frame 22 with an insulator bushing 26. The shank of the needle is threaded for adjustable spacing of the needle from the diaphragm 14 and is secured at the desired spacing by means of nuts 28.

The diaphragm 14 is stretched across the bushing 16 by fitting the periphery of the diaphragm over a ridge 30 of semicircular cross section that projects from the face of the flange 18. A ductile metal gasket 32 is then fitted over the exposed side of the diaphragm periphery, sandwiching the diaphragm periphery between the ridge 30 and the gasket. A semicircular ridge 34, matching the ridge 30, is formed in the face of the flange 24 for compressing the gasket 32. The flanges 18 and 24 are forced together uniformly by means of bolts 36 and nuts 38 that are evenly spaced around the periphery of the flanges. The gasket 32 is deformed thereby from a rectangular cross section to one that conforms to the semicircular ridges 30 and 34, whereby the gasket is evenly extruded radially inward toward the central axis of the device 10. The extruded inward edge of the gasket that is adjacent the diaphragm carries the periphery of the diaphragm 14 slightly inward of the face of the flange 18, causing the diaphragm to be stretched, free of wrinkles, over the face of the bushing 16. A hole 40, communicating with the vacuum system, is centrally located in the bushing and is axially aligned with the needle 20 so that the center of the diaphragm is aligned with the central axis of the needle, flanges and bushing.

The described mounting of the diaphragm 14 results in a tension in the diaphragm that is consistently comparable with other such mountings for diaphragms of the same material, thickness and diameter. Furthermore, with uniform secure tightening of the bolts 36, not only is the diaphragm stretched, but a vacuum seal is created at the diaphragm periphery; and due to the shape of the semicircular ridges 30 and 34 tightening of the bolts, even though the gasket is deformed, will not cause any shearing of the diaphragm by the ridges or gasket.

A power source 42 is connected across the needle 20 and diaphragm 14. A current limiting device may be arranged with the power source, for example, a fuse 44 is serially connected with the source across the needle and diaphragm.

In operation of the device 10, an undesired rise in pressure above ambient pressure within the vacuum manifold 12 is applied uniformly to the diaphragm through the bushing hole 40 and pump out holes 46. The diaphragm is moved symmetrically away from the bushing 16 and ultimately into electrical contact with the needle 20, creating a short across the power source 42. A large concentrated electrical current is thereby conducted through the diaphragm at the point of contact, causing an opening to be produced in an area of the diaphragm opposite the needle to relieve the overpressure.

The power source conveniently may be 110 v. AC, although other voltage levels, both AC and DC, could be used as well. The fuse 44 is an inexpensive and convenient means for limiting the size and duration of the short circuit current, although other current limiting devices could be used instead, such as a circuit breaker or charged capacitor as a power source. The needle 20 may be made to terminate in a sharp point as shown in the figure to produce a small rupture at a relatively low current, making it suitable for use with a small capacity fuse and power source. Alternatively, the needle point may be made blunt and used with a larger capacity fuse and power source, and therefore higher short circuit current, to produce a larger rupture for a large fluid flow and therefore faster overpressure relief.

The differential overpressure at which rupture of the diaphragm 14 occurs may be precisely predetermined by adjustment of the needle for known diaphragm deflections corresponding to known pressures. Diaphragm deflections are also predetermined by choice of diaphragm thickness and choice of diaphragm material.

A device exemplifying the invention was constructed in which 2 mil thick copper and aluminum diaphragms were tested in conjunction with a 1 inch O.D. vacuum manifold. The needle was spaced approximately 10 mils from the diaphragm and a 110 v. AC power source, in series with a 4 amp fuse, was placed across the diaphragm and needle. It was found that the copper diaphragms can be reliably ruptured with pressure differentials of less than 1.4 p.s.i. applied to the diaphragm. The diaphragms were vacuum sealed and observed to have a leak rate less than $10^{-9}$ atmospheric cc./sec. of helium.

While an embodiment of the invention has been shown and described, further embodiments or combinations of those described herein will be apparent to those skilled in the art without departing from the spirit of the invention.

I claim:
1. A device for the relief of overpressures, comprising:
    an electrically conductive diaphragm subject to differential overpressures that deflect said diaphragm;
    an electrode electrically insulated from said diaphragm, said electrode being normally spaced from said diaphragm for electrical and physical contact therewith upon deflection of said diaphragm in response to an overpressure; and
    means for connecting a power source across said diaphragm and said electrode to supply electrical current for rupturing said diaphragm upon deflection of said diaphragm into electrical and physical contact with said electrode, said diaphragm rupturing at the point of contact with said electrode.
2. The device of claim 1, further including a current limiting device connected with said means for limiting the current from the power source.
3. The device of claim 2 wherein said current limiting device is a fuse.
4. The device of claim 1, further including means for adjustably spacing said electrode from said diaphragm.
5. The device of claim 1, wherein said electrode is a sharply pointed puncture needle.
6. The device of claim 1, further including a bushing, and means for stretching said diaphragm across said bushing.
7. The device of claim 6, wherein said means for stretching said diaphragm includes:
    a first flange having a face with a ridge of semicircular cross section projecting therefrom, said ridge being congruent with the periphery of said diaphragm, said bushing being mounted within said first flange, and the periphery of said diaphragm being contiguous with said ridge projecting from said first flange;
    a second flange;
    a gasket positioned between said diaphragm and said second flange; and
    means for forcing said flanges together to deform said gasket and said diaphragm around said ridge for stretching said diaphragm across said bushing.
8. The device of claim 7, wherein said gasket is made of a ductile metal.
9. The device of claim 7, further including a ridge of semicircular cross section projecting from the face of said second flange for evenly extruding said gasket radially inward.

References Cited
UNITED STATES PATENTS

| 1,415,216 | 5/1922 | Bingay | 220—89 |
| 1,582,154 | 4/1926 | Zeiher et al. | 337—320 X |
| 2,230,961 | 2/1941 | Lewis | 220—89 |

RAPHAEL H. SCHWARTZ, Primary Examiner